(No Model.)
J. T. CLARK.
NUT LOCK.
No. 357,467. Patented Feb. 8, 1887.
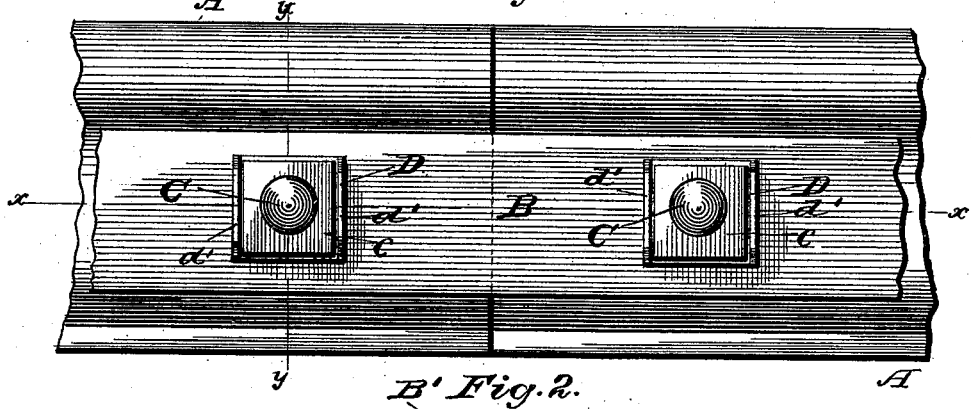
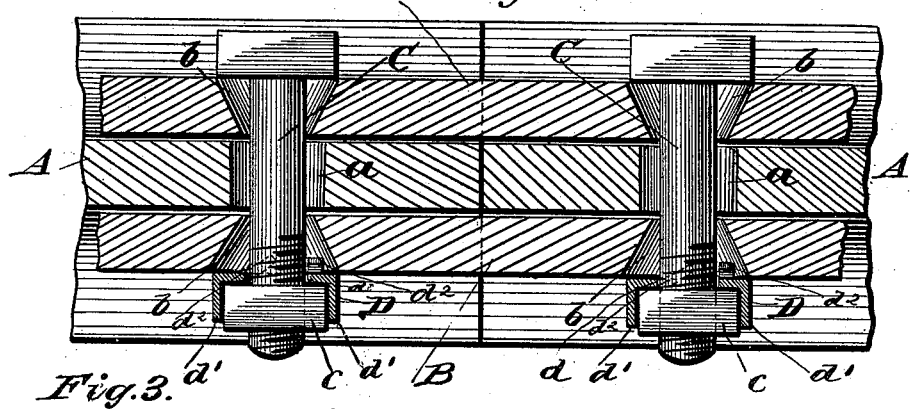
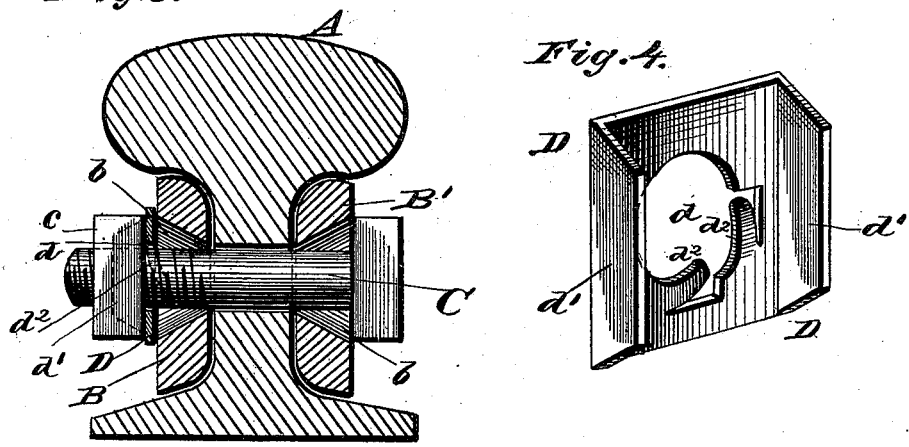
WITNESSES
Phil C. Dieterich
A. E. Dowell
INVENTOR
James T. Clark
by
T. H. Alexander
Attorney

UNITED STATES PATENT OFFICE.

JAMES T. CLARK, OF DENVER, COLORADO.

NUT-LOCK.

SPECIFICATION forming part of Letters Patent No. 357,467, dated February 8, 1887.

Application filed August 13, 1886. Serial No. 210,775. (No model.)

*To all whom it may concern:*

Be it known that I, JAMES T. CLARK, of Denver, in the county of Arapahoe and State of Colorado, have invented certain new and useful Improvements in Nut-Locks; and I do hereby declare that the following is a full, clear, and exact description thereof, reference being had to the accompanying drawings, and to the letters of reference marked thereon, which form part of this specification, in which—

Figure 1 is a side elevation of a section of railroad-track having my invention applied. Fig. 2 is a horizontal section on line $x\ x$, Fig. 1. Fig. 3 is a transverse vertical section on line $y\ y$, Fig. 1; and Fig. 4 is a perspective view of the locking-washer detached.

This invention relates to improvements in nut-locks, its object being to make a simple and effective device of the kind; and it consists, essentially, in the combination of a washer of peculiar construction with a bolt and nut, and one or more fish-rails provided with elongated bolt-slots. The construction of said washer is hereinafter described, illustrated in the drawings, and pointed out in the appended claims.

In the accompanying drawings the adjacent or meeting ends of two T-rails are designated A A, and B B' are two similar fish-plates connecting said ends and lying between the heads and flanges of the rails, on opposite sides thereof.

$a\ a$ are bolt-holes in the webs of the rails, at suitable distances from the ends thereof, and $b\ b$ are elongated bolt holes or slots in the opposite fish-plates. The said bolt-slots $b$ correspond in position with the holes $a$, so that a bolt, C, can pass through the web of the rail and the two fish-plates B B', with its head resting against the outer surface of the latter; and $c$ is a nut engaging the threaded end of said bolt to the outer side of the plate B.

D is a washer lying between the nut $c$ and the fish-plate B. The said washer is made of plate metal, and is provided with the central circular opening, $d$, for the passage of the bolt C. The opposite ends of the washer are upturned, so as to form the flanges $d'\ d'$, which stand at right angles to the body of the washer and closely clasp two opposite edges of the nut $c$ when the device is in position.

$d^2\ d^2$ are spring-detents formed by cutting the body of the washer on the edge of the opening $d$, so as to form fingers, and bending the same inwardly, or toward the rail. The distance between the ends of said spring-detents is one-quarter of the circumference of the opening $d$, and the detents point in the direction in which the nut is unscrewed.

When the parts are adjusted together, it is evident that when the nut is screwed up on the bolt the washer will turn therewith, and that the spring-detents $d^2$ will ride over the edges of the bolt-slot in the fish-plate B, so as not to prevent the rotation of the washer and nut; but should the nut start to unscrew, and consequently carry the washer with it by means of the flanges $d'\ d'$, the points of the spring-detents will engage against the edges of the said bolt-slot and prevent the disengagement of the nut.

The spring-detents are the quarter of the circumference of the opening $d$ apart, so that the nut cannot make more than a quarter-rotation without one of the spring-detents impinging against the edge of the bolt-slot.

Having described my invention, what I claim, and desire to secure by Letters Patent, is—

1. The combination, with the rails provided with suitable bolt-openings and the rail bolts and nuts of ordinary construction, of a fish-plate provided with the bolt-openings corresponding in position with those of the rails, and the washers each provided with a central opening for a bolt, outstanding flanges to clasp the two opposite sides of a nut, and one or more inwardly-standing spring-detents to impinge against the edge of the corresponding bolt-opening in the fish-plate to stop the outward movement of the washer, and consequently the unscrewing of the nut.

2. The combination, with the rails A, having the bolt-openings $a$, the bolts C, and the nuts $c$, of the fish-plates B B', each provided with the elongated bolt-slots $b\ b$, and the washers D, each provided with the central circular bolt-opening, $d$, and the two spring-detents $d^2$ $d^2$, standing on the edge of said openings a quarter of its circumference apart, and having two of its opposite ends turned outwardly to fit snugly against two opposite sides of the corresponding nut, all parts constructed and arranged substantially as shown and de-described, for the purpose specified.

In testimony that I claim the foregoing as my own I affix my signature in presence of two witnesses.

JAMES T. CLARK.

Witnesses:
  H. W. HAMMON,
  JOSEPH MILNER.